March 24, 1936.   M. B. BEHRMAN   2,035,111
BLADE AND HOLDER THEREFOR
Filed March 25, 1933   4 Sheets-Sheet 1

INVENTOR,
Marcus B. Behrman,
BY
ATTORNEY

March 24, 1936.    M. B. BEHRMAN    2,035,111
BLADE AND HOLDER THEREFOR
Filed March 25, 1933    4 Sheets-Sheet 4

INVENTOR,
Marcus B. Behrman,
BY
ATTORNEY

Patented Mar. 24, 1936

2,035,111

UNITED STATES PATENT OFFICE 2,035,111

BLADE AND HOLDER THEREFOR

Marcus B. Behrman, Brooklyn, N. Y., assignor to American Safety Razor Corporation, Brooklyn, N. Y., a corporation of Virginia Application March 25, 1933, Serial No. 662,664

18 Claims. (Cl. 30—60)

My present invention relates generally to a blade for safety razors and more particularly to a blade so formed that the parts or portions thereof can be variously dimensioned and otherwise variously characterized and are free to take individual and abnormal contours and positions out of the plane of other portions so that the blade parts can be caused to individually conform to correspondingly holder portions, and coordinately involves holders calling for such conformations.

I have illustrated my invention as embodied in a blade presenting opposed shaving edges because such a type blade is in general use and furthermore because my invention presents added advantages when embodied in a blade of this type. It will be understood that my invention may have a broader application and is therefore not to be so limited except to the extent that the language of the claims specifically calls for such construction.

My invention is to be distinguished from the well known double edged flexible blade in which while the contour of the blade is changed from the normal by the blade holder yet such change is included to be within the limits permitted by this flexibility. Such a blade presents a compromise between characteristics which permit it to flex and the limitations that such characteristics introduce into the blade structure and also the limitations incident to the fact that the blade must be made of a single sheet of material and on a quantity basis.

My invention must also be distinguished from constructions in which the blade is so constructed as to have parts thereof permanently fixed at an angle to each other.

My invention is to be further distinguished from an assembly comprising a plurality of blades associated together by means of an adapter.

Among other objects of my invention is the provision of a safety razor blade, the portions of which may be disposed toward each other in various angular relationships and yet one portion may be individually controlled independently of said portion, without disturbing such angular relationship, and without such angular adjustment interfering substantially with said other control.

A further object of my invention is the provision of a blade comprising interconnected blade sections which may be disposed at various angles to each other and have their contours, and in particular the contours of their shaving edges, varied independently of each other and of their angular adjustment.

It is a general object of my invention to provide a blade which has all the characteristics of a conventional razor blade and yet one in which parts thereof not only can freely vary their relationship to each other, as to both angling and contour deformations, but can be so made both structurally and as to materials employed as to give the parts individual varying characteristics.

It is also an object of my invention to provide holders adapted for use with razor blades having portions that may be angularly related, and controlled independently of each other and of said angular relation, and to provide such holders in a variety of forms to attain various effects desired in shaving, all such holders being adapted to hold razor blades of standard dimensions constructed in accordance with my invention.

For the attainment of these objects and such other objects as may hereinafter appear or be pointed out, I have illustrated various embodiments of my razor blade and various forms of holders adapted to hold said blades in the drawings, wherein:

In the drawings I have illustrated various forms and embodiments of my invention, and it is to be understood that it may be practiced in many other forms and embodiments such as will suggest themselves to those skilled in the art without departing from the spirit of the invention as defined by the claims. It is also understood that the various features disclosed are not necessarily to be associated in the relations described and illustrated herein, but that they may be employed singly or collectively in many other relations.

Before describing my invention in detail I will premise that it contemplates on the one hand a blade having sections so associated and related that the sections can assume varied angular relations in reference to each other and also can each assume varied contours permitted by the dimensions of such sections and the material of which it is made, each section in fact being subject to substantially that character of treatment and handling it would be were it not so associated and related. On the other hand, my invention contemplates that the manner of association of the sections shall be such that when moved to any relative angular position or conformed to any predetermined contours, they will cooperate to form a blade having the attributes of an integral blade so conformed.

A number of forms of such blades have been illustrated and described and various forms of holders adapted for use in connection with the blades disclosed have also been illustrated and described.

Figures 1, 2, 2A, 3, 4, 5, 6:
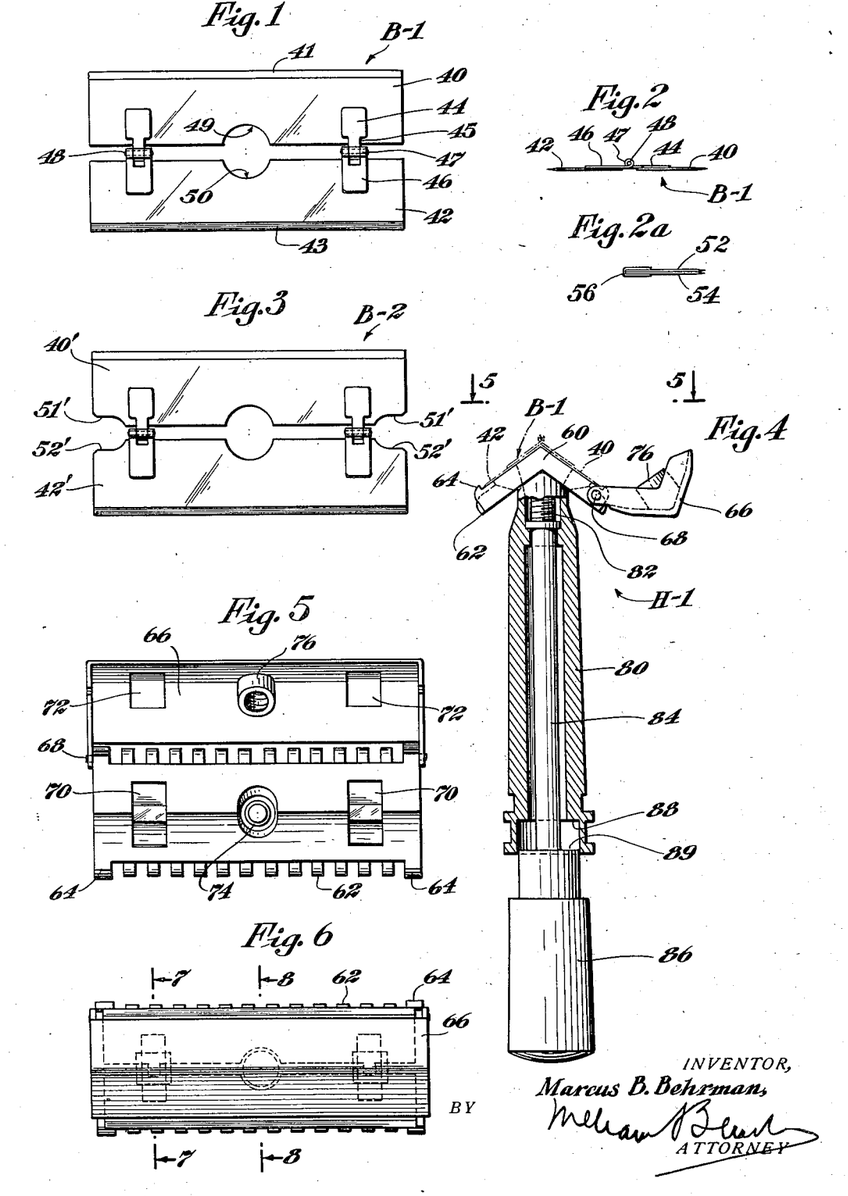
Figure 1 is a plan view of a safety razor blade constructed in accordance with my invention.
Figure 2 is an end view thereof.
Figure 2a is an end view of a modification of the blade of Figure 1 with its sections in folded position.
Figure 3 is a plan view of a modified form of blade.
Figure 4 is an elevational view, partly in section, of a holder adapted for use with the blades illustrated in Figures 1, 2 and 3, and types similar thereto showing the cover of the holder in open position.
Figure 5 is a plan view of the holder of Figure 4, as indicated at 5—5 in Figure 4, looking in the direction of the arrows.
Figure 6 is a view similar to Figure 5, except that the cover is shown in position over the blade and the holder.
Figure 7:
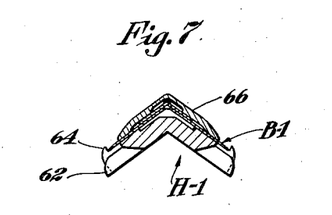
Figure 7 is a sectional view on the line 7—7 of Figure 6, looking in the direction of the arrows.
Figure 8:
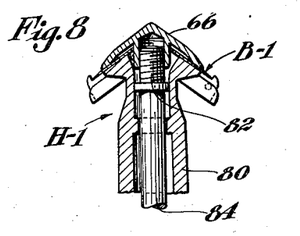
Figure 8 is a sectional view on the line 8—8 of Figure 6, looking in the direction of the arrows.
Figure 9:
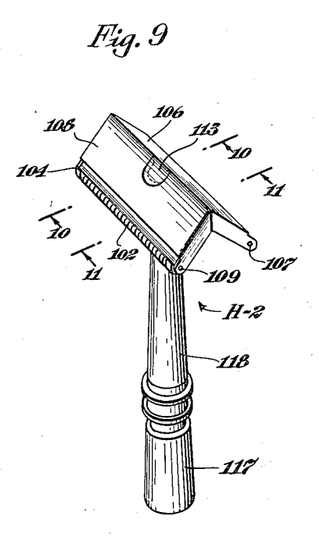
Figure 9 is a view in perspective of a modified form of holder adapted for use with the blades illustrated in Figures 1, 2 and 3, the cover members being shown in a position of use.
Figure 10:
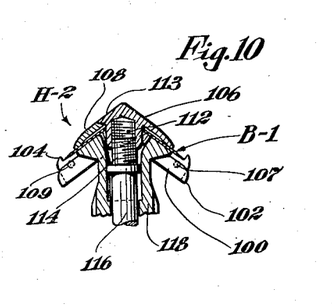
Figure 10 is an elevational sectional view taken on the line 10—10 of Figures 9 and 13, looking in the direction of the arrows.
Figure 11:
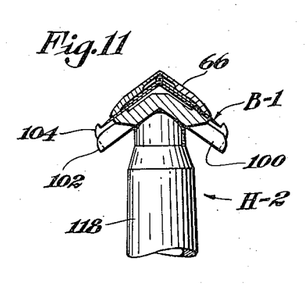
Figure 11 is a sectional view on the line 11—11 of Figures 9 and 13, looking in the direction of the arrows.

Referring to the drawings, it will be observed that in Figure 1 is shown a safety razor blade denoted in general by B—1, which is more or less typical of the other forms of blade herein disclosed and Figure 2 shows this blade in end view. It comprises in general two sections, 40 and 42, in parallel aligned relation and connected as by hinge members. Section 40 has a cutting edge at 41, and section 42 has a cutting edge at 43. I show a pair of hinge members comprising complementary hinge elements 44 and 46 having loops 45 and 47 formed at one end thereof and united by a hinge-pin 48 passing through said loops, said hinge elements are secured in any suitable way to the respective blades.

It will be observed that as a result of the hinge construction the sections 40 and 42 are free to position themselves in various angular relations with reference to each other and that with the character of hinges shown in Figure 1 if such angling takes place on the side on which the hinge-pin is located, the blade sections may be brought into face-to-face relation so that the edges 41 and 43 are in direct superimposed relation. This relation is approximately shown in Figure 2a in connection with a modification. It is also possible to bring the blade sections into a parallel relation, in which case they will be slightly spaced and will resemble a well known type of double edged blade. When the blade sections are angled on the side opposite the hinge-pin they may also be angularly related, but because of the unsymmetrical arrangement of the hinge-pin they will be brought into a limiting position before reaching a position in which the blade sections are in superposed parallel relationship.

It will further be observed that the blade sections 40 and 42 are shown as made of thin material of substantially uniform thickness, and that where this material is flexible, either sections may be flexed into an abnormal contour independently of the other section, so as to deform it, and in particular, to deform the shaving edge.

In succeeding portions of this specification, forms of holders have been described for making use of this capacity for angular and contour variation for use in shaving.

The aforementioned flexing of a blade section may take place in any direction, either longitudinally or transversely or in intermediate positions. This is possible because of the small area of the hinge elements which causes a minimum of interference with the normal capabilities of the sections. For instance, the hinge area being small, its stiffening effect on an otherwise flexible section will be correspondingly small. In particular, transverse flexures of the sections is possible even where two hinge elements are employed because the small longitudinal extent of the hinge pin is insufficient to prevent such transverse flexure. This functioning of the sections is somewhat dependent on the spacing of the hinge members where a plurality of such hinge members is used. By spacing the hinge members so as to bring them near the ends of the sections, I find that I attain a sufficient degree of interconnection without destroying the independence of the sections, even when relative angling takes place, always, however, provided that the longitudinal extent of the hinges is small as compared to the extent of the sections.

Figure 28:
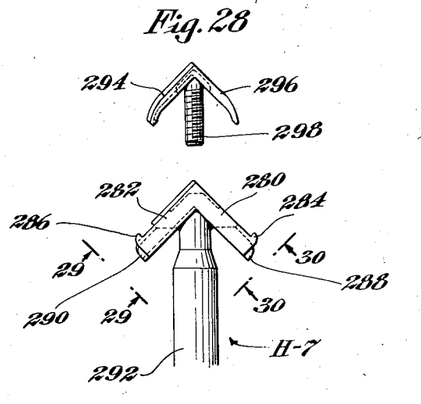
Figure 28 is an end elevation of a portion of another form of blade holder by which the user may obtain in a single holder a straight shaving edge and a curved shaving edge.

In Figure 28 I have illustrated a type of holder in which the capacity of my blade for flexure is utilized, as will be explained.

While I have shown the blade B—1 with two hinges, this is only by way of illustration, it being understood that this may be varied to meet specific requirements.

Figures 14, 15, 16, 17, 18, 19, 20:
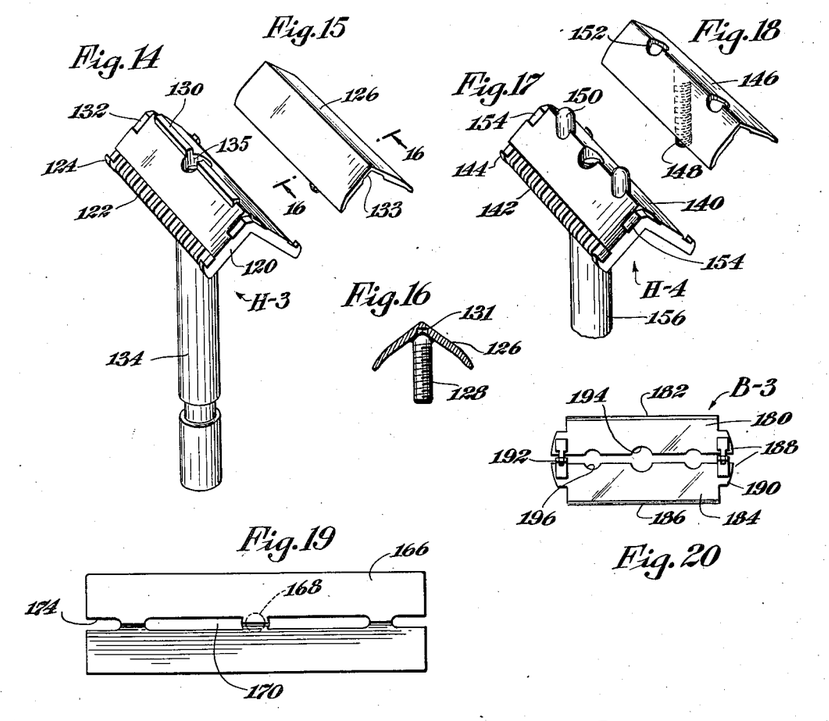
Figure 14 is a view in perspective of another form of holder with the cover removed.
Figure 15 is a view in perspective of a cover for use with the holder of Figure 14.
Figure 16 is a view in section on the lines 16—16 of Figure 15.
Figure 17 is a perspective view of a portion of still another form of holder.
Figure 18 is a perspective view of a cover member for the holder of Figure 17.
Figure 19 is a plan view of a modified form of cover for the holder of Figure 14.
Figure 20 is a plan view of a form of blade suitable for use with the holders shown in Figures 14 to 19.

At 49 and 50 portions of the sections 40 and 42 are cut away to make room for certain parts of the holder, as will be explained presently. At the same time they may serve to initially position the blade in the holder. It will also be observed that the sections are spaced from each other by their manner of association. This feature may be taken advantage of for locating purposes by providing locating portions on the holder such as for instance are shown in Figure 14. The hinges may similarly serve as lateral locating stops. It will therefore be observed that no cutting away of materials, for purposes of location, such as is frequently done in manufacturing one-piece blades, is necessary.

In Figure 2a is disclosed, in end view, a blade assembly comprising blade sections 52 and 54, similar to that of Figures 1 and 2, except that instead of the hinge connection of Figures 1 and 2, the blade sections are joined at one or more points by flexible material, such as rubber, as indicated at 56. This construction results in greater symmetry of action so that the blade sections may be brought substantially face to face when angled in either direction, and because the rubber is capable of stretching, limitation of the longitudinal extent along the blade sections of the rubber strip becomes of relatively less importance, in fact such extent may be coextensive with the opposed edges of the blade sections. If rubber is used, the further advantage is obtained that the sections, in addition to their angular adjustment may be separated from each other by stretching the rubber, which provides a type of adjustability useful in connection with certain types of holders.

The form of blade illustrated in Figure 3, and referred to in general by the letter B—2, is substantially the same as blade B—1, being composed of a pair of blade sections 40' and 42', identical in every way with the sections 40 and 42, except that portions 51' and 52' have been removed from the inner corners of the respective blades. This construction may be utilized for locating the blade in the holder in the manner disclosed in connection with the forms of Figures 20 and 21.

In Figure 4 is shown a holder adapted for use with blades such as B—1 or B—2 but it is also obvious that it is adapted for use with separate blades of suitable size. For purposes of illustration, the blade B—1 has been shown in position in dotted lines on the blade seat 60, which is provided with a guard edge 62, and blade stops 64 to prevent the shaving edges from advancing beyond the best shaving position, a condition which might exist where the blades are so wide that they would normally extend farther than the stops permit. A cover member 66 hinged to the blade seat at 68 is adapted to fold over the blade seat and clamp the blade in position. The blade seat 60 and the cover 66 are provided with recesses 70 and 72 to accommodate the hinged portions of the blade. The provision of these recesses makes it possible to use the blade with the hinged portion either above or below the blade. It is of course obvious that if desired either the recesses 70 or 72 may be omitted and the positioning of the blade correspondingly restricted.

In Figure 4 the hinges are shown above the blade, and will be accommodated by the recesses 72, but from what has been said it will be understood that this positioning can be reversed so that the hinges will be located in the recesses 70.

In order that the cover 66 may be clamped in place it is provided with an internally threaded boss 76, applied inside the cover and adapted, when the cover is in place, to pass through the cut-away portions 49 and 50 of the blade and into the recess 74 in the seat. The blade seat 60 is carried by a tubular handle member 80, within which is positioned the locking rod 84, adapted to engage in the boss 76 with its threaded end 82, and operable by rotation of the handle portion 86. To secure the proper locking effect cooperating shoulders 88 and 89 are provided on the parts 80 and 86 respectively, and when these are in engagement, as a result of threading the member 82 into the boss 76, the cover will be in its blade clamping position.

It will be observed that a holder of the form described will dispose the two halves of the blade, if a blade in accordance with my invention be used, or two separate blades, if such be used, at an angle to the handle convenient for shaving, and it is unnecessary for the user, while shaving, to hold the handle in inconvenient and unnatural positions for protracted periods in order to obtain an angle desirable for shaving. Together with this feature are associated accuracy of adjustment, since the shaving edges are always in the same position against the blade stops, as well as proper location of the blade in other respects and also ease of replacement and ready access of parts for cleaning purposes.

In Figures 9 to 13 I have disclosed a form of holder in which the single hinged cover of Figure 4 is replaced by two cover members hinged on opposite sides of the blade seat and meeting in the middle. The blade seat of this holder, denoted as a whole by H—2, is shown at 100, and is similar to the blade seat of Figure 4. The blade seat 100 is provided with guard edges 102 and blade stops 104, and is adapted for the reception of a blade such as that of Figures 1 and 2. By way of example, the blade B—1 of Figure 1 has been illustrated in position in the blade seat 100. One cover member 106 is hinged at 107 at one side of the blade seat, near the guard edge, and a complementary cover member 108 is hinged at the opposite side of the seat at 109. The cover member 106 is formed with an extension 113 beneath which is located the internally threaded boss 112. The cover member 108 is recessed to receive the extension 113, and the cover members are otherwise constructed so as to overlie the blade and clamp it in place. Locking of the cover members in place is effected by the threaded portion 114 of locking rod 116 which passes through the handle 118, this construction being similar to that in the form of Figure 4. It will be noted that because the extension 113 overhangs cover member 108, the locking of the cover member 106 will simultaneously effect locking of 108.

Figure 12:
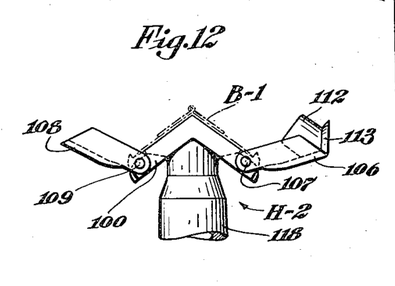
Figure 12 is an end elevational view of the holder of Figure 9 with the cover members in open position.
Figure 13:
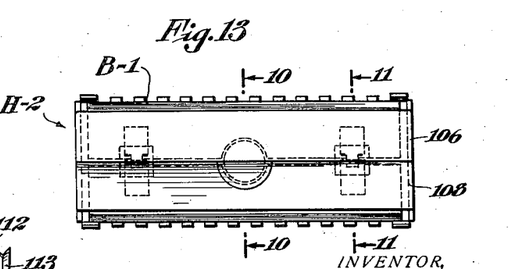
Figure 13 is a top plan view of the holder of Figure 9, the cover members being shown in place over blade positioned in the holder.

In Figure 12, which is an end view, the cover members 106 and 108 are shown in open position, and in Figure 13, which is a plan view, they are shown in the closed or locked position. This type of holder is similar to the type H—1 of Figure 4 but possesses the added advantage that one half of the blade may be held in place temporarily (by cover 108), without locking the entire blade.

In Figure 14 I illustrate a holder, indicated collectively by H—3, which in its general features is the same as the holder of Figure 4, and is provided with blade seat 120 having guard edges 122 and blade stops 124, and with a handle 134. Cut-away portions 132, to accommodate the hinge portions of the blade, are also provided. This form differs from the form of Figure 4 by having raised portions 130 which are adapted to enter the spaces between the blades and thereby to locate the same on the blade seat. The cover for this holder is illustrated in Figures 15 and 16 and is indicated at 126. It differs from the cover of the form of Figure 4 in being entirely separated from the holder and instead of being internally threaded it has an outwardly threaded portion 128 adapted to pass through the hole 135 in the blade seat and to fit into a corresponding internally threaded portion on a locking rod located within the handle 134, and which is not illustrated in detail, because of its similarity to the construction of Figure 4. Recesses 131 are provided in the cover to accommodate the raised portions 130 of the blade seat, and recesses 133 are also provided therein for the accommodation of the hinged portions of the blade.

In the holder H—4 of Figures 17 and 18, the raised portions 130 are replaced by a pair of lugs 150 adapted to fit into the corresponding cut-out portions 196 of the blade B—3 shown in Figure 20. Otherwise this holder is similar to the holders of Figures 4 and 14. Its blade seat 140 is provided with guard edges 142 and blade stops 144, and a cut-away portion 154 is also provided to accommodate the hinge portions of the blades. The cover member 146, shown in perspective in Figure 18, is similar to that of Figure 15, being provided with a threaded extension 148 for locking purposes, but a modification is necessary because of the substitution in the holder H—4 of the lugs 150 for the raised portions 130 of holder H—3. This modification consists in the provision of holes 152 aligned with the lugs 150 and adapted to receive them when the cover is in place on the holder.

Figure 19 shows a modification of the cover member of Figure 15. In this figure the cover 156 is provided with openings 170 adapted to receive the raised portions 130 of the holder H—3 of Figure 14 and with the slots 174 adapted to receive the hinged portions of the blade.

The holders H—3 and H—4 just described possess the advantage over H—1 and H—2 of greater accessibility of parts for cleaning purposes, while on the other hand, it has more disconnected parts, because the cover member is separated from the holder. The various locating features also provide greater accuracy of adjustment than in forms H—1 and H—2.

In Figure 20 is shown a hinged blade B—3, useful in connection with the holder of Figures 17 and 18, because it is provided with cut-away portions 196 adapted to receive the lugs 150. It consists of a pair of blades 180 and 184 having shaving edges 182 and 186 respectively. The respective blades are provided with extensions 188 and 190, projecting beyond the rectangular contour of the blades and beyond the shaving edges, to which hinges 192 are applied. Cut-away portions 194 form a circular opening adapted to receive the extension 148 of the cover 146 and cut away portions 196 provide openings through which lugs 150 may pass.

It is to be noted that while the cut away portions 196 make this blade particularly suitable for use with the holders of Figures 17 and 18, the blade is equally well adapted for use with the holders of Figures 4 or 14, as will be obvious by an inspection of the blades and of the holders. The location of the hinges beyond the shaving edges leaves portions of the blades opposite these edges without reenforcement or constraint of any kind, a condition highly desirable for certain adjustment purposes, and in connection with certain types of holders.

Figure 21:
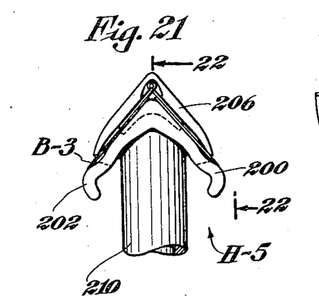
Figure 21 is an end elevation of a portion of a holder showing the blade seats inclined at a steeper angle than in the other forms shown, which angle is suitable for the attainment of certain desirable effects.
Figure 22:
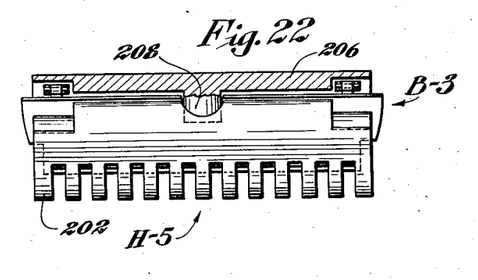
Figure 22 is a sectional view on the line 22—22 of Figure 21, looking in the direction of the arrows.

In Figures 21 and 22 is shown a type of holder, H—5, by which the sections of the composite blade, when inserted therein, are disposed at an acute angle to each other, and the blade seat is correspondingly contoured to effect this purpose. This results in a different normal shaving angle, the blades being at a lesser normal inclination to the shaving surface and to the handle than they are in the forms previously described, which results in a different shaving effect. In these figures 200 denotes the blade seat having guard edges 202. The cover is shown at 206 and this carries the locking boss 208 adapted to cooperate with a locking rod (not shown) located in the handle 210, this construction being similar to that previously described.

Figure 23:
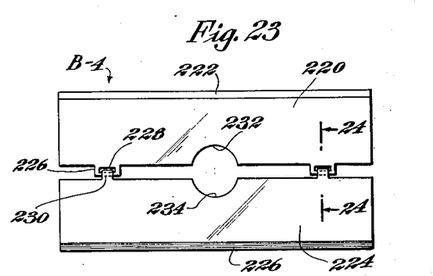
Figure 23 is a plan view of a further modification of the blade, illustrating in particular a variation in the hinge construction.
Figure 24:
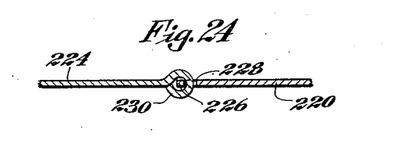
Figure 24 is an enlarged sectional view on the line 24—24 of Figure 23, looking in the direction of the arrows, and showing the hinge construction in section.

In Figures 23 and 24 I show a modification of the provision for associating the blades together. Whereas in the types previously described, separate hinge members were secured to the blades, in the form B—4, illustrated in Figure 23, I show the hinges integrally formed with the blades 220 and 224. The blade 220 has ears 226 provided with apertures 228 extending therefrom into which fit the hook or loop portions 230 projecting from blade 224. These blades are provided with the respective shaving edges 222 and 226, and also with cut-away portions 232 and 234 to form the opening necessary to accommodate the boss carried by the cover, as previously described.

In this form, as illustrated, it will be noticed that the blades are separated from each other by a space which may be used for purposes of locating the blade in the holder. By extending the inner blade edges until they reach the hinge axis, this spacing may be eliminated, as will be obvious to those skilled in the art. This blade has the advantage over previous forms that the blade thickness is uniform throughout, and nowhere do reinforcements interfere with its flexibility.

Figure 25:
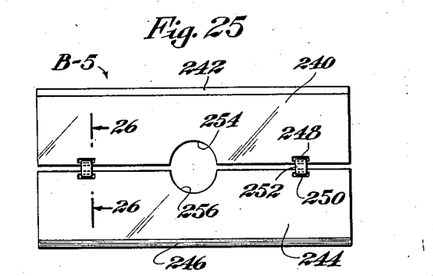
Figure 25 is a plan view of another modification of the blade showing a substitute for the hinge construction.
Figure 26:
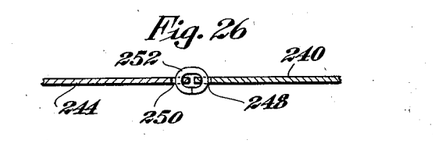
Figure 26 is an enlarged sectional view on the line 26—26 of Figure 25, looking in the direction of the arrows, and showing the details of the construction.

In Figure 25, which shows a composite blade B—5, the union between the blades 240 and 244 is effected by loops which are illustrated as formed of wire and as passing through the apertures 248 and 250 in the respective blades. These blades are provided with shaving edges 242 and 246, and with cut-away portions 254 and 256 for accommodating the cover, as already described. It will be noted that this loop construction gives a great range of adjustability to the blades, as there are no shoulders to oppose adjustment and the blades may be brought face to face no matter in which direction they are folded, and the contact so effected may be so close, as to bring the surfaces of the blades into actual contact. As illustrated, the blades are close together, but if desired, they may be spaced. In this form also, the blades are of uniform thickness throughout and without the application of any reinforcing material.

Figure 27:
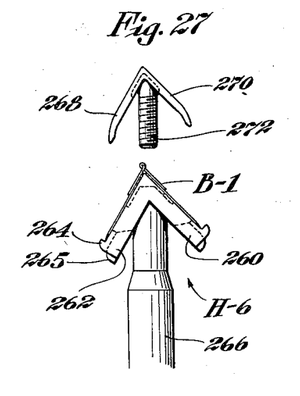
Figure 27 is an end elevation of a portion of a modified form of holder, with the cover separated from the blade seat, showing a seat having two portions disposed at different angles to the handle, so that two different shaving positions for the blade may be conveniently obtained from only one holder.

In Figure 27 I show a holder, H—6, having a blade seat, the two halves of which are disposed at different angles to the handle, so that a person using the razor may obtain different results without the necessity of using more than a single holder. In this figure 260 and 262 denote the blade seats, 262 being more acutely inclined to the handle 266 than 260. Guard edges 265 and blade stops 264 are also provided, and a blade of the B—I type is indicated in place. While the blade is illustrated as of this type, it is to be understood that other forms of blades disclosed would serve equally well.

The cover member has angularly inclined portions 268 and 260 corresponding in inclination to the portions of the blade seat already described, and, as in the other forms described, is provided with a screw threaded extension 272, for locking purposes.

Figure 29:
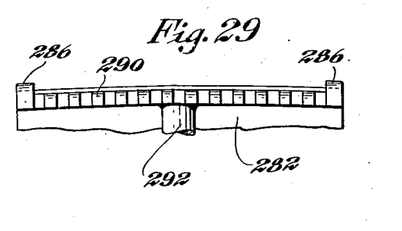
Figure 29 is a view on the line 29—29 of Figure 28, looking in the direction of the arrows, showing plainly the curved shaving edge.
Figure 30:
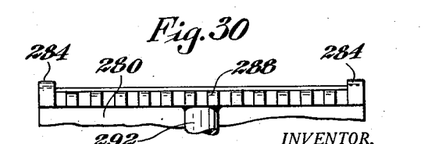
Figure 30 is a view on the line 30—30 of Figure 28, looking in the direction of the arrows, showing the straight shaving edge on the holder of Figure 28.

A further modified form of holder, H—7, is shown in Figures 28, 29 and 30. In this form the blade seat portions 280 and 282 are equi-angularly disposed, (although not necessarily so), with relation to the handle, but whereas blade seat 280 is flat as in the forms previously described, blade seat 282 is warped convexly in a longitudinal direction. This is clearly illustrated in Figure 29, which is a view on line 29—29 of Figure 28.

Figure 30, is a view, similar to Figure 29, of the flat blade seat 280. Guard edges 288 and 290, and blade stops 284 and 286 are provided, as in the previous form, and the handle member 292 is similar to the form previously disclosed. The cover member has two halves 294 and 296, corresponding respectively to the warped portion 282, and to the flat portion 280, and is also provided with a threaded extension 298 for locking purposes. It will be seen that on inserting a blade such as B—I and clamping it in place, the blade seat 280 will give a straight shaving edge for ordinary use, while the blade seat 282 will provide a curved shaving edge suitable for use in shaving hollowed surfaces.

It will be obvious that the construction of forms H—6 and H—7 may be combined to give a still greater variety of effects obtainable with a single razor.

Having thus described my invention and illustrated its use, what I claim as new and desire to secure by Letters Patent is:

1. The provision for use with a safety razor, of a pair of opposed blade sections, each section having an outer shaving edge and a parallel inner edge, means for pivotally associating said sections to form a unitary blade, said means comprising elements uniting restricted portions of the inner edges of said sections so as to permit variation of the angular relation between said sections, without subjecting either said sections or said associating means to flexure stresses, and portions of said sections of restricted area relatively to the area of said sections cooperating with said elements to effect said union of the sections, whereby said sections are pivotally associated into a unitary assembly and their shaving edges are normally constrained to a predetermined relationship, and whereby independent deformations or flexing of said shaving edges from said predetermined relationship to adapt them for use with a holder requiring such deformation or flexing will not be prevented.

2. The provision for use with a safety razor, of a pair of opposed blade sections, each blade section being wafer-like, of substantially uniform thickness and having an outer shaving edge and a parallel inner edge, elements uniting restricted portions of the inner edges of said sections, so as to permit free variation of the angular relation between said blade sections without flexing of the material thereof and without generating stresses tending to restore the sections to a normal angular relation, portions of said blade sections of restricted extent relatively to the area of said sections cooperating with said elements to effect said union of the sections, whereby said sections are pivotally associated into a unitary assembly and their shaving edges are normally constrained to a predetermined relationship, and whereby independent deformation of said shaving edges from said predetermined relationship to adapt them for use with a holder requiring such deformation, will not be prevented.

3. For use with a safety razor, a blade comprising a pair of flexible wafer type sections each made of a single piece of homogeneous material throughout, and each having an outer shaving edge and an inner edge, means carried by portions of said sections for associating said sections with their inner edges in opposed relation, to permit the angular relation between said sections to be varied without flexure of the material of said blade sections or said associating means, the extent of such blade portions as cooperate with said means to effect such association being small in comparison with the area of the blade surface, and of small longitudinal extent compared with the longitudinal extent of the opposed blade section edges, whereby said sections are associated into a unitary assembly the portions of which may be angularly varied without substantial impairment of the independent individual control of said sections in other respects and whereby said sections may be angled without flexure thereof and may be flexed independently of the angling, at substantially any point thereof.

4. In a safety razor, a blade comprising a pair of sections, each having an outer shaving edge and an inner edge, means for associating said sections in spaced end to end relation so as to permit of their relative angular variation without flexure of said sections or of said associating means, the portions of the sections, cooperating with said means to effect such association being small in comparison with the area of the blade surface, so that the greater portion of said blade area is free, and of small longitudinal extent compared with the longitudinal extent of the opposed blade edges, so that the greater portion of said inner edges is free, and whereby said sections are associated into a unitary assembly without substantial impairment of the independent adjustability of each to the predetermined requirements of the corresponding blade holding means, said spaced inner edges serving for associating the blade with a holder.

5. For use with a safety razor, a pair of blade sections provided with shaving edges and with inner inoperative edges, extensions provided at the end portions of said sections and extending beyond the limits of said shaving edges, and means associated with said extensions for uniting said sections, so as to bring said inner edges into opposed relation, and whereby they are adapted to be angularly related to each other without flexure of the material of said sections or the material of said uniting means.

6. For use with a safety razor, a pair of wafer-type blade sections of substantially uniform thickness and provided with shaving edges and with inner inoperative edges, extensions provided at the end portions of said sections and extending beyond the limits of said shaving edges, and means associated with said extensions for uniting said sections so as to bring said inner edges into opposed relation, and whereby they are adapted to be angularly related to each other without flexure of the material of said sections or the material of said uniting means.

7. A blade for use in a safety razor, said blade comprising two sections, each having an outer shaving edge and an inner inoperative edge, and means for associating the two with their back edges in adjacency, to permit of free angling movement of one section with reference to the other, said means being in the form of loops passing through openings in the blades adjacent their inner edges, whereby the blade presents two shaving edges, and whereby the positions of said sections are angularly variable with reference to each other, and said sections are also free to assume independently varied contours to conform to the requirements of a holder associated therewith.

8. A safety razor comprising a handle, a blade seat carried by said handle, and a cover adapted to hold a blade in place on said seat; said blade seat having contiguous, flat portions angularly disposed to each other and to said handle and each having a guard edge and abutments to determine the position of a shaving edge of a blade; a blade comprising flexible wafer type sections pivotally united so as to be adapted for angular variation relatively to each other without flexure of said sections whereby they may seat on the respective sections of the blade seat, with their shaving edges engaging the abutments thereon and be flexed independently of said angular adjustment to conform to the contour of said blade seat and each blade section having a shaving edge adapted, by the association of said blade section and blade seat, to be brought into operative relation with a guard edge of the blade seat; said cover being shaped so as to be substantially complementary in form to said blade seat, and adapted by association with the blade seat to clamp the blade therebetween, said handle having a hollow portion and a locking member passing therethrough, and threaded means on said locking member adapted to cooperate with threaded means on said cover member to cause said cover member to lock a blade in place when said locking member is brought into threaded engagement with said cover member and is rotated to a sufficient extent.

9. In a safety razor, a blade seat of wedge conformation having contiguous angularly related flat portions, a flat cover member hingedly carried by and adapted to overlie one of said portions, a flat cover member hingedly carried by and adapted to overlie the other of said portions, a handle associated with said blade seat, locking means carried within said handle and adapted to engage cooperating means on one of said cover members for the purpose of locking it in place, and interengaging portions on the other cover member and the last mentioned cover member whereby when the last mentioned cover member is locked in position, said interengaging portions will also serve to positively lock the other cover member in position.

10. The provision in a safety razor of a holder comprising a cap member, a blade seat, and a handle portion associated therewith, said blade seat being of wedge-shaped conformation and comprising two sections disposed substantially in angularly disposed planes intersecting each other, one of said sections being substantially flat and the other section being warped transversely out of its normal plane, whereby when blades are inserted in interlocking engagement between said cap member and said blade seat, said blades will be angularly related and one blade will present a straight shaving edge and the other blade will present an edge warped transversely to the plane of the blade.

11. A blade for a safety razor comprising wafer-like sections each sharpened along one edge to present a shaving edge and means for permanently connecting the other edges of said sections in opposed end to end relation, said association being of a character so as to permit the sections to be moved freely relatively to each other in either direction from a position in a common plane to an angular relation without flexing of the blade material and the material of said connecting means, said opposed edges of the sections being free of the connecting means except for a relatively small portion thereof.

12. A blade for a safety razor comprising wafer-like sections each sharpened along one edge to present a shaving edge, and means for permanently connecting the sections for associating them with their other edges in opposed spaced end to end relation, said association being of a character so as to permit the sections to be moved freely relatively to each other in either direction from a position in a common plane to an angular relation without flexing of the blade material or the material of said connecting means, said opposed edges of the sections being free of the connecting means except for a relatively small portion thereof, whereby the spacing between the blades can serve as means for locating the blade with reference to the holder.

13. A safety razor comprising a handle, a blade seat carried by said handle and a cover adapted to hold a blade in place on said seat; said blade seat having two substantially flat portions angularly disposed to each other and to said handle and each having a guard edge; a blade comprising two sections pivotally united so as to be adapted for angular variation relatively to each other without flexure of said sections whereby they may seat on the respective sections of the blade seat and each blade section having a shaving edge adapted, by the association of said blade section and blade seat, to be brought into operative relation with a guard edge of the blade seat; said cover being shaped so as to be substantially complementary in form to said blade seat, and adapted by association with the blade seat to clamp the blade therebetween; said cover comprising two sections, each pivoted to one of said portions of the seat, said handle having a hollow portion and locking member passing therethrough, and threaded means on said locking member to cause said cover member to lock a blade in place when said locking member is brought into threaded engagement with said cover member and is rotated to a sufficient extent.

14. In a safety razor, a blade seat having contiguous angularly related flat portions, a cover member hingedly carried by and adapted to overlie one of said portions, and a second cover member adapted to overlie the other of said portions, a handle associated with said blade seat, locking means carried within said handle and adapted to engage cooperating means on one of said cover members for the purpose of locking it in place, said last mentioned cover member having a projection thereon adapted to engage the other cover member in overlapping relation thereto when the cover members are in operative position on the blade seat, whereby when said cover member is locked in position, said projection thereon will also serve to lock the other cover member in position.

15. In a safety razor, a blade seat having angularly related portions, a cover member hingedly united to one of said portions, a second cover member hingedly united to the other of said portions, a handle associated with said blade seat, locking means carried within said handle and adapted to engage cooperating means on one of said cover members for the purpose of locking it in place, and interengaging portions on the other cover member and the last mentioned cover member whereby when the last cover member is locked in position, said interengaging portions will also serve to positively lock the other cover member in position, said other cover member having no other locking provision.

16. In a safety razor, a blade seat having angularly related portions, a cover member hingedly united to one of said portions, a cover member hingedly united to the other of said portions, a handle associated with said blade seat, locking means carried within said handle and adapted to engage cooperating means on one of said cover members for the purpose of locking it in place, and interengaging portions on the other cover member and the last mentioned cover member whereby when the last mentioned cover member is locked in position, said interengaging portions will also serve to lock the other cover member in position, and blade stops carried by said blade seat portions.

17. A blade for a safety razor comprising wafer-like sections, associative means for so relating the sections as to form a blade assembly having opposed shaving edges and having the inner edges of the sections in parallel opposed relation, the said sections being free for relative angular movement from an end-to-end position in a common plane to either side of said plane without subjecting either the material of the sections or of the said associative means to flexure stresses, the length of the aforementioned means in a direction parallel to the shaving edges being so small as compared to the length of the shaving edge, that the inner edges are free of said associating means through substantially the entire extent thereof, whereby said sections may be flexed at substantially any point and in any direction, independently of the angular relation of said sections.

18. A composite razor blade comprising two sections arranged in end to end relation and each section having an inner edge opposed to and spaced from the inner edge of the other section and an outer cutting edge positioned in parallel relation to the cutting edge of the other section, and coaxial pivotal hinge means uniting said sections at a plurality of points on their opposed inner edges so as to permit angling of said sections relatively to each other, the axial extent of said hinge means being approximately of the order of the width of the spacing between the opposed inner edges of the sections, said hinge means comprising pin receiving members located on said sections, and pins passing through said members.

MARCUS B. BEHRMAN.